(12) United States Patent
Kim et al.

(10) Patent No.: US 10,454,643 B2
(45) Date of Patent: Oct. 22, 2019

(54) METHOD FOR MULTIPLEXING DMRS AND DATA IN NEW RADIO AND APPARATUSES THEREOF

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/058,140

(22) Filed: Aug. 8, 2018

(65) Prior Publication Data

US 2019/0052425 A1  Feb. 14, 2019

(30) Foreign Application Priority Data

Aug. 11, 2017 (KR) .................. 10-2017-0102451
Jun. 15, 2018 (KR) .................. 10-2018-0068747

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01)

(58) Field of Classification Search
CPC ........... H04W 72/042; H04W 72/0406; H04W 72/0446; H04W 72/12; H04W 72/005; H04W 72/04; H04W 72/0413; H04W 72/14; H04L 5/0048; H04L 5/0023; H04L 5/0053
See application file for complete search history.

(56) References Cited

U.S. PATENT DOCUMENTS

2013/0223264 A1* 8/2013 Miki ............... H04L 5/0053
                                                      370/252
2019/0007175 A1* 1/2019 Kwak ................ H04L 5/00

OTHER PUBLICATIONS

3GPP, "5G; Study on New Radio (NR) access technology (3GPP TR 38.912 version 14.0.0 Release 14)", ETSI TR 138 912 V14.0.0 (May 2017), pp. 1-76.

* cited by examiner

*Primary Examiner* — Diane D Mizrahi
(74) *Attorney, Agent, or Firm* — IP Legal Services, LLC

(57) ABSTRACT

The provided are a method of transmitting and receiving data using empty resource elements (REs) located in a demodulation reference signal (DMRS) symbol in a next-generation/5G radio access network. The method of a base station for transmitting DMRS port allocation information to a terminal may include configuring one or more available RE patterns; transmitting, to the terminal, information indicating an available RE pattern to be used by the terminal among the available RE patterns; and transmitting the DMRS port allocation information to the terminal. The available RE pattern is composed of REs to which no DMRSs are allocated among REs located on a symbol to which DMRSs are to be allocated, and through the REs in the available RE pattern, the base station receives uplink data from the terminal or transmits downlink data to the terminal.

15 Claims, 13 Drawing Sheets

METHOD FOR MULTIPLEXING DMRS AND DATA IN NEW RADIO AND APPARATUSES THEREOF

CROSS REFERENCE TO RELATED APPLICATION

This application claims priority from Korean Patent Application Nos. 10-2017-0102451 & 10-2018-0068747, filed on Aug. 11, 2017 & Jun. 15, 2018, which are hereby incorporated by reference for all purposes as if fully set forth herein.

BACKGROUND OF THE INVENTION

1. Field of the Invention

The present disclosure relates to a method of allocating a demodulation reference signal (DMRS) port to a terminal in a next generation/5G radio access network (hereinafter referred to as a new radio (NR)) and transmitting/receiving data using empty resource elements (RE) placed in a DMRS symbol.

2. Description of the Prior Art

The 3rd Generation Partnership Project (3GPP) recently approved a study item "Study on New Radio Access Technology" for studying next generation/5G radio access technology. Based on this, Radio Access Network Working Group 1 (RAN WG1) is discussing frame structures, channel coding and modulation, waveforms, and multiple access methods for new radio (NR). Compared to LTE/LTE-Advanced, it requires to design NR to satisfy various needs required for segmented and specified usage scenarios as well as improved data transmission rates.

Representative usage scenarios of NR may include enhancement Mobile BroadBand (eMBB), massive Machine Type Communication (mMTC), and Ultra Reliable and Low Latency Communications (URLLC). In order to satisfy requirements of each usage scenario, it requires to design a flexible frame structure in comparison with LTE/LTE-Advanced.

In particular, there is an increasing need to determine a specific method for allocating data to empty resource elements (RE) present on a symbol where a demodulation reference signal (DMRS) is placed in the current NRG and for signaling data allocation information to a EU.

SUMMARY OF THE INVENTION

In the foregoing background, the present disclosure is directed to a method of allocating demodulation reference signal (DMRS) port and allocating data to empty resource elements (RE) placed in a DMRS symbol in order to multiplex data and DMRSs in the NR.

In accordance with an embodiment, a method of a base station may be provided for transmitting demodulation reference signal (DMRS) port allocation information to a terminal. The method may include: i) configuring one or more available resource element (RE) patterns; ii) transmitting, to the terminal, information indicating an available RE pattern to be used by the terminal among the available RE patterns; and iii) transmitting the DMRS port allocation information to the terminal, wherein the available RE pattern is composed of REs not allocated to DMRSs among REs located on a symbol and available to be allocated to, and wherein through the REs in the available RE pattern, the base station receives uplink data from the terminal or transmits downlink data to the terminal.

In accordance with another embodiment, a method of a terminal may be provided for receiving demodulation reference signal (DMRS) port allocation information from a base station. The method may include: i) receiving information indicating an available resource element (RE) pattern to be used by the terminal among one or more available RE patterns configured by the base station; and ii) receiving the DMRS port allocation information from the base station, wherein the available RE pattern is composed of REs not allocated to DMRSs among REs located on a symbol and available to be allocated to DMRS, and wherein through the REs in the available RE pattern, the terminal receives downlink data from the base station or transmits uplink data to the base station.

In accordance with further another embodiment, a base station may be provided for transmitting demodulation reference signal (DMRS) port allocation information to a terminal. The base station may include a controller configured to configure one or more available resource element (RE) patterns; and a transmitter configured to transmit, to the terminal, information indicating an available RE pattern to be used by the terminal among the available RE patterns and configured to transmit the DMRS port allocation information to the terminal, wherein the available RE pattern is composed of REs not allocated to DMRSs among REs located on a symbol and available to be allocated to DMRSs, and wherein through the REs in the available RE pattern, the base station receives uplink data from the terminal or transmits downlink data to the terminal.

In accordance with still another embodiment, a terminal may be provided for receiving demodulation reference signal (DMRS) port allocation information from a base station. The terminal may include a receiver configured to receive information indicating an available resource element (RE) pattern to be used by the terminal among one or more available RE patterns configured by the base station and configured to receive the DMRS port allocation information from the base station, wherein the available RE pattern is composed of REs not allocated to DMRSs among REs located on a symbol and available to be allocated to DMRSs, and wherein through the REs in the available RE pattern, the terminal receives downlink data from the base station or transmits uplink data to the base station.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
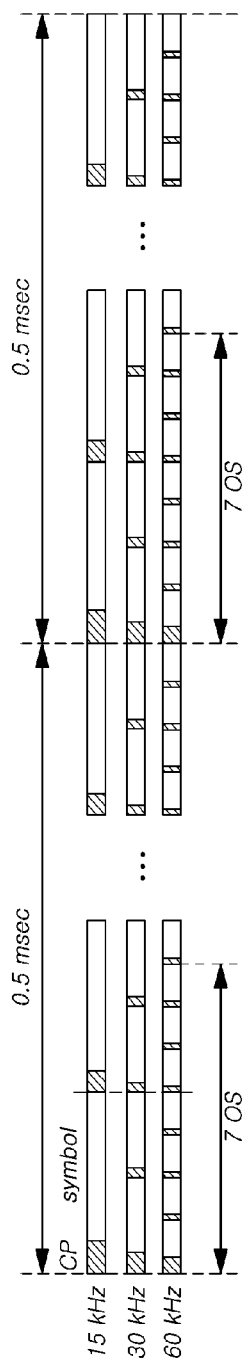
FIG. 1 is a diagram showing arrangement of orthogonal frequency-division multiplexing (OFDM) symbols when different subcarrier spacings are used according to embodiments.

Hereinafter, some embodiments of the present disclosure will be described in detail with reference to the accompanying drawings. When assigning a reference number to each component shown in the drawings, it should be noted that the same components are given the same reference numbers even though they are shown in different drawings. Further, in the following description of embodiments of the present disclosure, a detailed description of known functions and configurations incorporated herein will be omitted when it is determined that the description may make the subject matter of the present invention unclear.

In this specification, a wireless communication system refers to a system for providing various communication services such as a voice service, a packet data service, and the like. The wireless communication system includes a user equipment (UE) and a base station (BS).

The UE may be an inclusive concept indicating a terminal utilized in wireless communication, including a mobile station (MS), a user terminal (UT), a subscriber station (SS), a wireless device, and the like in global systems for mobile communication (GSM) as well as a UE in wideband code division multiple access (WCDMA), long term evolution (LTE), high speed packet access (HSPA), International Mobile Telecommunications for 2020 and beyond (IMT-2020)(5G or New Radio), and the like.

The base station, or a cell, generally refers to a station that communicates with a UE and semantically covers a Node-B, an evolved Node-B (eNB), a gNode-B (gNB), a Low Power Node (LPN), a sector, a site, various forms of antennas, a base transceiver system (BTS), an access point, a point (e.g., a transmission point, a reception point, a transmission/reception point), a relay node, a megacell, a macrocell, a microcell, a picocell, a femtocell, a remote radio head (RRH), a radio unit (RU), a small cell, and the like.

There is a base station for controlling each of the above various cells. Thus, the base station may be construed in the following two ways: (1) the base station may be an apparatus that provides a megacell, a macrocell, a microcell, a picocell, a femtocell, and a small cell in association with a wireless area; or (2) the base station may indicate the wireless area itself. In (1), the base station may be i) apparatuses that provide a predetermined wireless area and that are controlled by the same entity or ii) apparatuses that interact with one another to cooperatively configure a wireless area. Based on the configuration type of the wireless area, a point, a transmission/reception point, a transmission point, a reception point, and the like may be examples of the base station. In (2), the base station may be a wireless area itself where signals are received or transmitted from the perspective of the UE or from the stance of a neighboring BS.

In this specification, a cell may refer to the coverage of a signal transmitted from a transmission/reception point (or a transmission point), a component carrier having the coverage of a signal transmitted from a transmission/reception point, or a transmission/reception point itself.

In this specification, the UE and the base station are used as two (uplink or downlink) inclusive transceiving subjects to embody the technology or technical concepts described in the specification and may not be limited to predetermined terms or words. Here, uplink (UL) refers to data transmission and reception from a UE to a base station, and downlink (DL) refers to data transmission and reception from the base station to the UE.

UL transmission and DL transmission may be performed using one of i) a time division duplex (TDD) scheme in which the transmission is performed by means of different times, ii) a frequency division duplex (FDD) scheme in which the transmission is performed by means of different frequencies, and iii) a mixed scheme of the TDD scheme and the FDD scheme may be used.

Also, in a wireless communication system, a specification is formed by configuring the uplink and the downlink based on a single carrier or a pair of carriers. The uplink and the downlink may carry control information through a control channel such as a Physical Downlink Control Channel (PDCCH) and a Physical Uplink Control Channel (PUCCH) and may carry data through a data channel such as a Physical Downlink Shared Channel (PDSCH) and a Physical Uplink Shared Channel (PUSCH).

The downlink may refer to communication or a communication path from a multi-transmission/reception point to a terminal, and the uplink may refer to communication or a communication path from a terminal to a multi-transmission/reception point. In the downlink, a transmitter may be a part of the multi-transmission/reception point, and a receiver may be a part of the terminal. In the uplink, a transmitter may be a part of the terminal, and a receiver may be a part of the multi-transmission/reception point.

Hereinafter, signal transmission and reception through a channel such as PUCCH, PUSCH, PDCCH, and PDSCH may be expressed as "PUCCH, PUSCH, PDCCH, and PDSCH are transmitted or received."

Meanwhile, higher layer signaling, which will be described below, includes Radio Resource Control (RRC) signaling that carries RRC information including RRC parameters.

The base station performs downlink transmission to terminals. The base station may transmit the PDCCH for carrying downlink control information such as scheduling needed to receive a downlink data channel, which is a primary physical channel for a unicast transmission, and also carrying scheduling approval information for transmission through an uplink data channel. Hereinafter, transmission and reception of a signal through each channel will be described as transmission and reception of a corresponding channel.

There are no restrictions on multiple access schemes applied to wireless communication systems. Various multiple access schemes, such as Time Division Multiple Access (TDMA), Frequency Division Multiple Access (FDMA), Code Division Multiple Access (CDMA), Orthogonal Frequency Division Multiple Access (OFDMA), Non-Orthogonal Multiple Access (NOMA), OFDM-TDMA, OFDM-FDMA, and OFDM-CDMA, may be used. Here, NOMA includes Sparse Code Multiple Access (SCMA), Low Density Spreading (LDS), and the like.

Embodiments are applicable to resource allocation in an asynchronous wireless communication scheme that evolves to LTE/LTE-Advanced and IMT-2020 via GSM, WCDMA, and HSPA and in a synchronous wireless communication scheme that evolves to CDMA, CDMA-2000, and UMB.

In this specification, a machine type communication (MTC) terminal may refer to a terminal that supports low cost (or low complexity), a terminal that supports coverage enhancement, or the like. Alternatively, in this specification, the MTC terminal may refer to a terminal that is defined in a predetermined category for supporting low cost (or low complexity) and/or coverage enhancement.

In other words, in this specification, the MTC terminal may refer to a newly defined third generation partnership project (3GPP) Release 13 low cost (or low complexity) UE category/type, which executes LTE-based MTC-related operations. Alternatively, in this specification, the MTC terminal may refer to a UE category/type that is defined in or before 3GPP Release-12 that supports the enhanced coverage in comparison with the existing LTE coverage or supports low power consumption or may refer to a newly defined Release 13 low cost (or low complexity) UE category/type. Alternatively, the MTC terminal may refer to a further enhanced MTC terminal, which is defined in Release-14.

In this specification, a NarrowBand Internet of Things (NB-IoT) terminal refers to a terminal that supports radio access for cellular IoT. The objectives of the NB-IoT technology include improved indoor coverage, large-scale support for low-rate terminals, low latency sensitivity, low terminal cost, low power consumption, and an optimized network structure.

Representative usage scenarios in new radio (NR), which is recently being discussed in the 3GPP, are eMBB, mMTC, and URLLC.

In this specification, a frequency, a frame, a subframe, resources, resource blocks, a region, a band, a sub-band, a control channel, a data channel, a synchronization signal, various kinds of reference signals, various kinds of signals, and various kinds of messages which are associated with NR may be interpreted with various meanings in the past, at present, or in the future.

[5G NR]

Representative usage scenario in new radio (NR), which is recently being discussed in the 3GPP, may include eMBB, mMTC, and URLLC.

In this specification, a frequency, a frame, a subframe, resources, resource blocks, a region, a band, a sub-band, a control channel, a data channel, a synchronization signal, various kinds of reference signals, various kinds of signals, and various kinds of messages which are associated with NR may be interpreted with various meanings in the past, at present, or in the future.

The 3GPP recently approved a study item "Study on New Radio Access Technology" for studying next generation/5G radio access technology. Based on this, discussion of frame structures, channel coding and modulation, waveform & multiple access schemes, and the like for the NR has begun.

Compared to LTE/LTE-Advanced, it requires to design NR to satisfy various requirements for segmented and specified usage scenarios as well as improved data transmission rates. In particular, as representative usage scenarios of NR, eMBB, mMTC, and URLLC were proposed. In order to satisfy requirements of each usage scenario, it is required to design a flexible frame structure in comparison with LTE/LTE-Advanced.

Since each usage scenario has different requirements such as data rates, latency, coverage, and the like, there is a need for a solution for efficiently multiplexing a radio resource unit based on different numerologies (e.g., subcarrier spacing, sub-frame, TTC, etc.) as a method for efficiently satisfying requirements for each usage scenario through a frequency band of an arbitrary NR system.

As a method for this need, there have been discussions conducted for developing a method of multiplexing numerologies having different sub-carrier spacing (SCS) values through a single NR carrier on the basis of TDM, FDM, or TDM/FDM and supporting the multiplexed numerologies and a solution of supporting one or more time units when configuring a scheduling unit in a time domain. In this regard, a subframe is defined in NR as a kind of time domain structure, and a single subframe duration consisting of 14 OFDM symbols of the same 15 kHz SCS-based normal CP overhead as that of LTE is determined to be defined as reference numerologies for defining a corresponding subframe duration. Thus, the subframe in NR has a time duration of 1 ms.

That is, unlike LTE, the subframe of NR is an absolute reference time duration, and a slot and a mini-slot may be defined as time units based on actual uplink/downlink data scheduling. In this case, a value y, which is the number of OFDM symbols constituting a corresponding slot, is determined as y=14, irrespective of numerologies.

Accordingly, an arbitrary slot may consist of 14 symbols. According to a transmission instruction of a corresponding slot, all symbols may be used for DL transmission, for UL transmission, or in the form of DL portion+gap+UL portion.

Also, a mini-slot consisting of a smaller number of symbols than that of the corresponding slot may be defined in an arbitrary numerology (or SCS). Thus, a time-domain scheduling interval having a short length may be set for uplink/downlink data transmission/reception on the basis of the definition, or a time-domain scheduling interval having a long length may be configured for uplink/downlink data transmission/reception through slot aggregation.

In particular, in the case of transmission and reception of latency-critical data such as URLLC, when scheduling is made in units of a slot based on 0.5 ms (7 symbols) or 1 ms (14 symbols), which is defined in a frame structure based on a numerology having a small SCS value such as 15 kHz, it may be difficult to satisfy latency requirements. Accordingly, a mini-slot consisting of a smaller number of OFDM symbols than that of the corresponding slot may be defined. Thus, on the basis of the definition, latency-critical data may be defined as being scheduled like the corresponding URLLC.

Alternatively, as described above, a solution of scheduling data according to latency requirements on the basis of a slot (or a mini-slot) length defined for each numerology is also considered by multiplexing numerologies having different SCS values in a single NR carrier by TDM scheme or FDM scheme and supporting the multiplexed numerologies. For example, as shown in FIG. 1, when the SCS is 60 kHz, the symbol length is reduced to about ¼ of that seen when the SCS is 15 kHz. Accordingly, when one symbol consists of seven OFDM symbols, a slot length based on 15 kHz is 0.5 ms, and a slot length based on 60 kHz is reduced to about 0.125 ms.

As described above, by defining different SCS values and different TTI lengths in NR, a method for satisfying requirements of URLLC and eMBB is being discussed.

[NR DMRS]

In order for DL DMRS of the typical LTE-A to support 8-layer transmission, a total of eight antenna ports defined from ports 1 to 14 are defined (hereinafter, an antenna port for DMRS may be referred to as a DMRS port).

Figure 2:
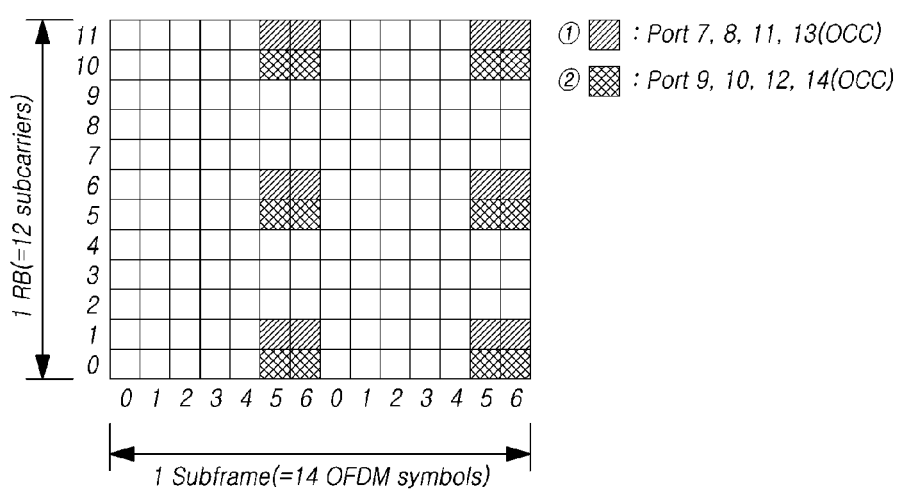
FIG. 2 is a diagram showing a downlink (DL) demodulation reference signal (DMRS) structure in LTE-A.

FIG. 2 is a diagram showing a DMRS structure to which an orthogonal cover code (OCC) is applied in order to transmit PDSCH in LTE downlink. Referring to FIG. 2, the antenna ports 7, 8, 11, and 13 may use DMRS resource elements (REs) indicated by a pattern ①, and the antenna ports 9, 10, 12, and 14 may use DMRS REs indicated by a pattern ②.

At this time, the OCC is used to maintain orthogonality between antenna ports allocated to the same DMRS REs, and the values are shown in Table 1 below.

TABLE 1

| Antenna port p | The sequence $\overline{w}_p(i)$ for normal cyclic prefix $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In the current NR, the DL DMRS is defined as follows:

A UE is configured by higher layers with DMRS pattern either from the front-loaded DMRS Configuration type 1 or from the front-loaded DMRS Configuration type 2 for DL/UL:

Configuration type 1:
  One symbol: Comb 2+2 CS, up to 4 ports
  Two symbols: Comb 2+2 CS+TD-OCC ({1 1} and {1 −1}), up to 8 ports
  Note: It should be possible to schedule up to 4 ports without using both {1,1} and {1,−1}.

Configuration type 2:
  One symbol: 2-FD-OCC across adjacent REs in the frequency domain up to 6 ports
  Two symbols: 2-FD-OCC across adjacent REs in the frequency domain+TD-OCC (both {1,1} and {1,−1}) up to 12 ports
  Note: It should be possible to schedule up to 6 ports without using both {1,1} and {1,−1}.

From UE perspective, frequency domain CDMed DMRS ports are QCLed.

FFS: Whether the front-load DMRS configuration type for a UE for UL and DL can be different or not.

Note: If there are significant complexity/performance issues involved in the above agreements, down-selection can still be discussed Two types of DMRSs may be supported for NR DMRS. The type of used DMRS may be determined through configurations corresponding to the maximum number of DMRS ports.

Front-loaded DMRS configuration 1: Comb+CS structure+TD-OCC

Front-loaded DMRS configuration 2: FD-OCC+TDM/TD-OCC

Comb+CS Based DMRS Structure (Supporting Up to 8 DMRS Ports)

In the front-loaded DMRS configuration 1, two types of structures may be defined depending on the number of symbols in which DMRSs are carried. The structures may be classified as a 1-symbol DMRS structure as shown in FIG. 3 and a 2-symbol DMRS structure as shown in FIG. 4.

A 1-symbol DMRS refers to a DMRS consisting of one symbol, and a 2-symbol DMRS is a DMRS consisting of two symbols. Accordingly, a specific DMRS may be placed in one or two symbol sections on an RE.

Figure 3:
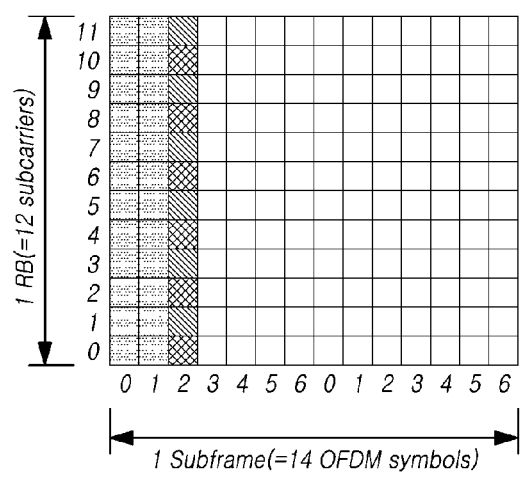
FIG. 3 is a diagram showing a 1-symbol DMRS structure configured in a form of Comb2+CS.

For example, a DMRS in FIG. 3 may be placed on a symbol indicated by symbol index 2. In this case, the symbol indicated by symbol index 2 may be a DMRS symbol that can be allocated to the DMRS. (e.g., a DMRS symbol which the DMRS can be allocated to).

Figure 4:
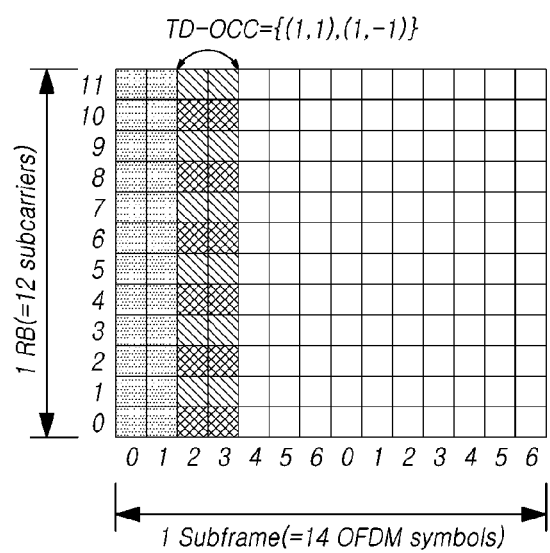
FIG. 4 is a diagram showing a 2-symbol DMRS structure configured in a form of Comb2+CS.

For another example, DMRSs in FIG. 4 may be placed on symbol indicated by symbol index 2 and symbol index 3. In this case, the symbols indicated by symbol index 2 and symbol index 3 may be each a DMRS symbol, which is a symbol available to be allocated to the DMRS (e.g., is a symbol which the DMRS can be allocated to).

A resource block (RB) is a unit used by a base station to schedule a data channel or a control channel for a UE. Such a RB is configured in the form of a two-dimensional (2D) block on a frequency axis and a time axis. Each RB may be composed of several REs, each of which may be indicated by a specific symbol index and a specific sub-carrier index. An example in which one RB is composed of 14 OFDM symbols on the time axis and 12 sub-carriers on the frequency axis will be described below.

In this case, Comb is related to a method in which DMRSs are mapped on a resource block and indicates that DMRSs set by the same DMRS port are mapped to sub-carriers having a certain interval. For example, Comb2 is set such that the difference between sub-carrier indices of the DMRSs set as the same DMRS port is 2 (e.g., DMRS set as DMRS port 0 are placed at sub-carrier indices 0, 2, 4, 6, 8, and 10), and Comb4 is set such that the difference between the sub-carrier indices set as the same DMRS port is 4 (e.g., DMRS set as DMRS port 0 are placed at sub-carrier indices 0, 4, and 8). FIG. 3 shows a 1-symbol DMRS structure configured in the form of Comb2+CS.

First, as shown in FIG. 3, for Comb2+2CS structure, there may be two types of regions for each sub-carrier. Here, the regions may be classified as a region displayed with a pattern ① and a region displayed with a pattern ②. Two types of cyclic shift values are applied to each region to generate a total of four orthogonal ports.

FIG. 4 is a diagram showing a 2-symbol DMRS structure configured in a form of Comb2+CS.

Referring to FIG. 4, the 2-symbol DMRS structure is shown and may have a basic structure using a pattern in which the 1-symbol DMRS structure is repeated. However, the 2-symbol DMRS structure is different from the 1-symbol DMRS structure with respect to which method is applied for spreading in the time domain.

For example, for TD-OCC={(1,1)}, a simple repetition structure is used, and thus the number of DMRS ports supported does not increase. However, since two orthogonal codes are additionally used for TD-OCC={(1,1),(1,−1)}, the maximum number of DMRS ports to be supported may increase by a factor of two.

DMRS Structure Based on FD-OCC Pattern (Support Up to 12 DMRS Ports)

In the front-loaded DMRS configuration 2, two types of modes may be defined depending on the number of symbols in which DMRSs are carried. The structures may be classified as a 1-symbol DMRS structure as shown in FIG. 5 and a 2-symbol DMRS structure as shown in FIG. 6.

Figure 5:
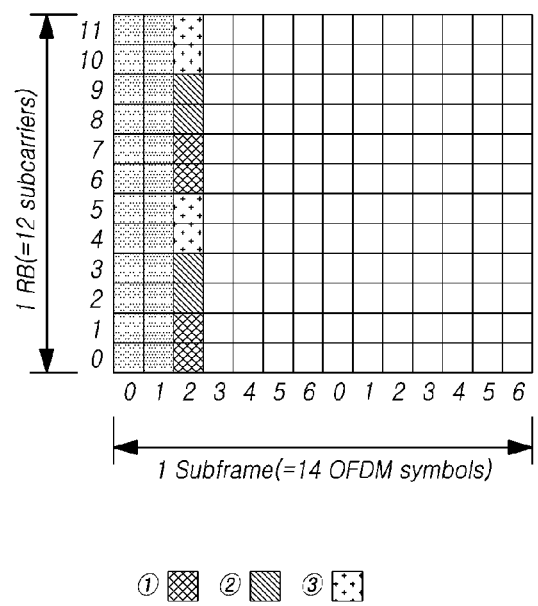
FIG. 5 is a diagram showing a 1-symbol DMRS structure configured in a form of 2-FD-OCC.
Figure 6:
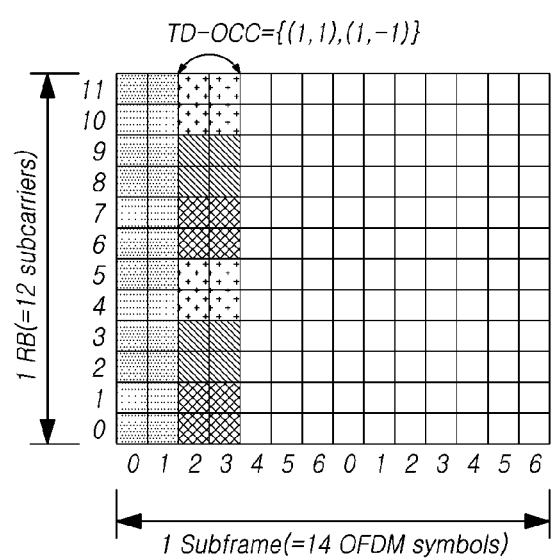
FIG. 6 is a diagram showing a 2-symbol DMRS structure configured in a form of 2-FD-OCC.

FIG. 5 is a diagram showing a 1-symbol DMRS structure configured in a form of 2-FD-OCC.

First, for a 2-FD-OCC structure having up to 6 ports as shown in FIG. 5, two consecutive sub-carriers are adjacent to each other in the frequency domain and allocated to one DMRS. That is, as shown in FIGS. 3 and 4, DMRSs may be placed in two sub-carrier sections instead of one sub-carrier section.

In this case, since 2-FD-OCC basically uses OCC(={(1, 1),(1,−1)}) of length-2, two DMRS ports may be supported only to the region displayed with a pattern ①. Accordingly, since three regions displayed with patterns ①, ②, and ③ are shown in FIG. 5, a total of six DMRS ports may be supported.

FIG. 6 is a diagram showing a 2-symbol DMRS structure configured in a form of 2-FD-OCC.

Subsequently, the 2-symbol DMRS structure is shown in FIG. 6, and as shown, the 2-symbol DMRS structure has a basic structure based on a 1-symbol DMRS pattern and TD-OCC is applied to support up to 12 ports.

For example, since two orthogonal codes are additionally used for TD-OCC={(1,1),(1,−1)}, 12 (=6*2) ports, which indicates 6 ports for each of two symbols, may be supported as shown in FIG. 6.

Hereinafter, various embodiments of a method of multiplexing data and DMRSs within a DMRS symbol according to the two DMRS configurations will be described in detail.

When DMRS ports are not allocated to resource elements (REs) present on a DMRS symbol (e.g., a symbol in which a DMRS is present), such REs may be empty REs. Accordingly, there are many discussion for developing a method of additionally allocating data to the empty REs.

Hereinafter, embodiments of a method for indicating (e.g., transmitting) locations and number of available resource elements (available REs) to be used for data transmission using only a minimum number of information fields will be described below.

The following embodiments may be applied to all of a front-loaded DMRS symbol regions and additional DMRS symbol regions.

The following embodiments may be applied individually or in combination.

Embodiment 1: Transmitting Only the Number of Available Patterns of Empty REs, Except for DMRSs, to UE Generally, information on DMRS port configuration may be transmitted to a UE by default for multiplexing DMRSs and data. When MU-MIMO is considered, it may be necessary to transmit not only i) information on DMRS port configuration for MU pairing UEs that share the same temporal resources and frequency resources but also ii) information on a DMRS port being used by a UE.

In order to transmit the DMRS port configuration information for the MU pairing UEs, significant signaling overheads may be generated. Furthermore, such operation is contrary to transparent pairing, which is a basic concept of MU-MIMO. Thus, it may require changes in the related specification.

The term "transparent" means that each UE does not need to know or consider whether to operate in SU-MIMO or in MU-MIMO.

In this embodiment, it is necessary to consider the MU paring UEs. Therefore, if DMRS port allocation information is directly transmitted in this embodiment, it is expected that the size of DMRS indication information will significantly increases. Furthermore, such operation is also contrary to the transparent pairing.

Accordingly, in this embodiment, a base station delivers only information regarding a region of available REs to a UE.

The available RE region or available RE may denote REs not allocated with DMRS in DMRS symbols (e.g., REs that DMRS are not allocated to). Also, a pattern for available REs may denote information on a group of the available REs. In this case, depending on the DMRS configurations, the pattern for the available REs may have different structures.

The available RE pattern may be referred to as a DMRS code division multiplexing (CDM) group, but the term or word is not limited thereto.

In the following embodiments, a method of preferentially defining a pattern of available REs before delivering information on the available REs to a UE will be described.

Figure 7:
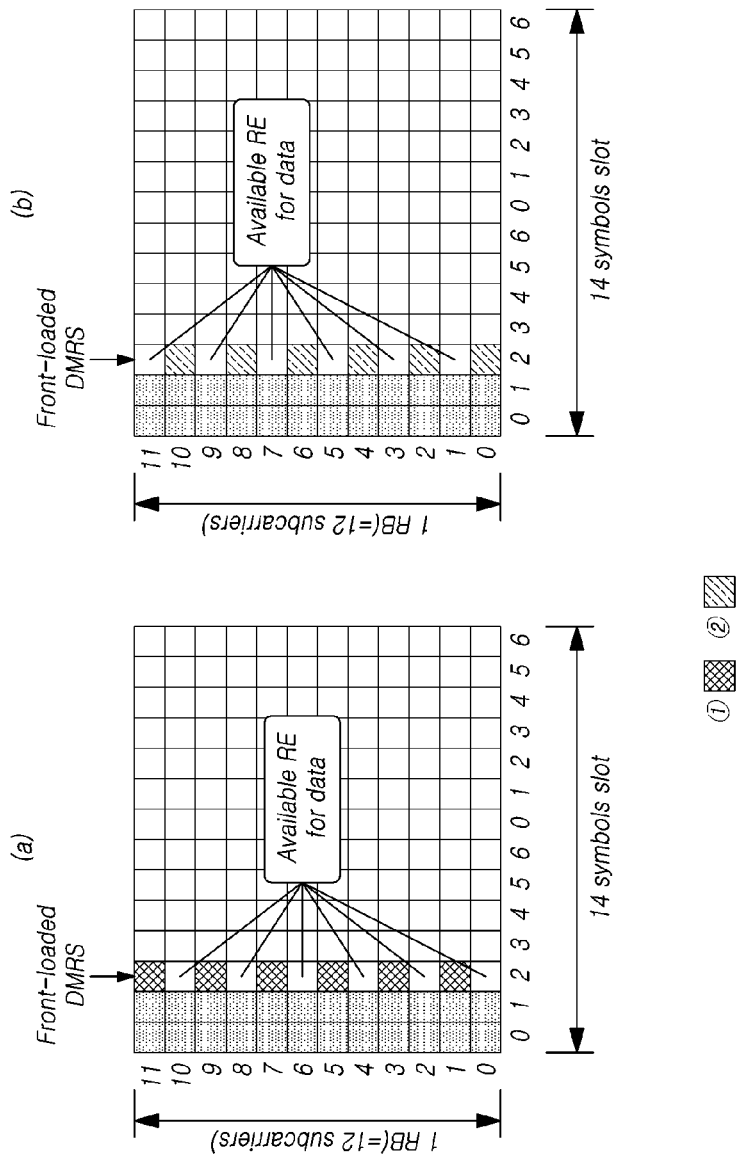
FIG. 7 is a diagram showing a pattern of empty resource elements (REs) in a form of Comb+CS.

Embodiment 1-1: Configuring all REs Other than DMRS REs in DMRS Configuration 1 (Comb+CS) by Using One Data Allocation Pattern FIG. 7 shows a method for defining a pattern of an available RE region in DMRS configuration 1 (Comb+CS) according to an embodiment. Hereinafter, a method of defining a pattern of an available RE region on the basis of Comb2 structure will be described below as an example (however, this method may also be applied to Comb4).

For example, it is assumed that DMRS port indices are defined to be 0, 1, 2, 3, 4, 5, 6, and 7 (a total of eight orthogonal ports). In this case, the specific values of the indices may be changed to other values.

When DMRS port 0 is allocated to a UE, DMRS mapping (a region displayed with a pattern ①) may be achieved as shown in a portion (a) of FIG. 7. In this case, two cyclic shifts may be applied to the same DMRS RE. As a result, DMRS ports 0 and 1 may be allocated.

In this case, basically, the UE may receive its own DMRS port allocation information through downlink control information (DCI) of PDCCH. In this case, only one pattern of available REs may be present for both cases of portion (a) of FIG. 7 and portion (b) of FIG. 7.

Accordingly, it is possible to inform the UE of whether data is transmitted through an empty RE region of the available RE pattern by using only 1-bit information as the available RE pattern.

That is, the following information may be included in a field of DCI indicating the DMRS port allocation information.

DMRS port indication field: DMRS port allocation information for UE

Available RE pattern indication field: Information indicating whether data is to mapped to empty RE present in DMRS symbol Here, the UE may perform interpretation according to the 1-bit information value allocated to the available RE pattern indication field.

0: Data not transmitted through empty RE

1: Data transmitted through empty RE

At this time, the UE may perform operations based on the available RE pattern indication field irrespective of whether or not MU-MIMO pairing is performed in its time resource region and frequency resource region. Accordingly, when in the DMRS symbol of the UE, a DMRS port of another UE is mapped to the empty RE, the base station may set the available RE pattern indication field to be 0 and deliver mapping information of accurate data REs to the UE.

In addition, since the length (e.g., the number of bits) of the available RE pattern indication field may vary depending on the DMRS configuration, the numbers of bits of the available RE pattern indication fields determined according to the DMRS configurations may be set to the same value, that is, the largest number among the numbers of bits.

That is, when the number of bits of the available RE pattern indication field in the DMRS configuration 2 (2-FD-OCC) is two, the number of bits of the available RE pattern indication field in the DMRS configuration 1 (Comb+CS) may be set to two. This method may be identically applied to cases in which the number of bits is 3, 4, 5, or larger.

Embodiment 1-2: Configuring all REs Other than its Own DMRS RE in DMRS Configuration 2 (2-FD-OCC) by Using Two Groups of Data Allocation Patterns FIG. 8 shows a method for configuring DMRS (DMRS configuration 2: 2-FD-OCC) according to an embodiment.

For example, DMRS port indices are defined to be 0, 1, 2, 3, 4, 5, 6, 7, 8, 9, 10, and 11 (a total of twelve orthogonal ports). In this case, the specific values of the indices may be changed to other values.

Figure 8:
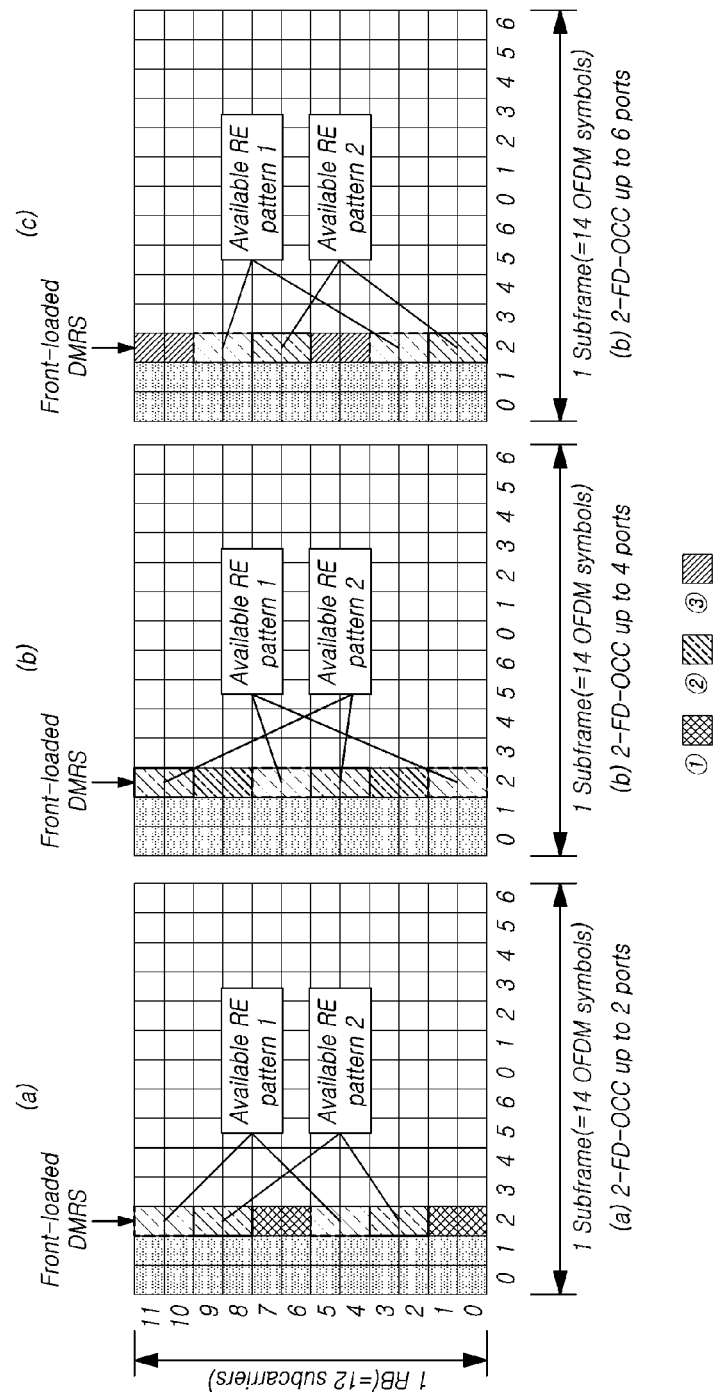
FIG. 8 is a diagram showing a pattern of empty REs in a form of 2-FD-OCC.

When DMRS port 0 is allocated to a UE, DMRS mapping (a region displayed with a pattern ①) may be achieved as shown in a portion (a) of FIG. 8. In this case, OCCs of length-2 may be applied to the same DMRS RE. As a result, DMRS ports 0 and 1 may be allocated.

In this case, basically, the UE may receive its own DMRS port allocation information through DCI of PDCCH, like in Embodiment 1-1. In this case, up to two patterns of available REs may be present in each of the cases shown in portions (a), (b), and (c) of FIG. 8. Accordingly, it is necessary to have two or more bits for a pattern indicating the available REs, By using the two or more bits, it is possible to express whether data is transmitted through an empty RE region on the available RD pattern.

That is, the following contents may be included in a DCI field.

In other words, the following information may be included in a field of DCI notifying the UE of the DMRS port allocation information.

DMRS port indication field: DMRS port allocation information for a UE

Available RE pattern indication field: Information indicating whether data is mapped to an empty RE in a DMRS symbol Here, the UE may perform interpretation according to the 2-bit information value allocated to the available RE pattern indication field.

00: Data not transmitted through empty RE
01: Data transmitted through empty RE on available RE pattern 1
10: Data transmitted through empty RE on available RE pattern 2
11: Data transmitted through empty REs on available RE pattern 1 and available RE pattern 2

At this time, the UE performs operations based on the available RE pattern indication field irrespective of whether or not MU-MIMO pairing is performed in its time resource region and frequency resource region. Accordingly, when in the DMRS symbol of the UE, a DMRS port of another UE is mapped to the empty RE, the base station may instruct the UE not to transmit the data to the region to which the DMRS port of the other UE is mapped by using the available RE pattern indication field.

For example, the UE has a DMRS allocated to a region displayed with a pattern ②, as shown in (b) of FIG. 8.

In this case, when the other UE has a DMRS port allocated to a RE of available RE pattern 1 through MU-MIMO pairing, the available RE pattern indication field delivered to the UE is set to 10, and the UE may recognize that data is mapped only to REs on the available RE pattern 2.

In addition, the available RE pattern in this embodiment may be determined relative to the location of a DMRS RE allocated to the UE.

For example, despite the same available RE pattern 1, the location indicating the available RE may vary as shown in portions (a) to (c) of FIG. 8. The available RE pattern 1 may indicate REs on sub-carrier indices 4, 5, 10, and 11 in the portion (a) of FIG. 8, may indicate REs on sub-carrier indices 0, 1, 6, and 7 in the portion (b) of FIG. 8, and may indicate REs on sub-carrier indices 2, 3, 8, and 9 in the portion (c) of FIG. 8.

Embodiment 1-3: Upon the Occurrence of MU-MIMO Pairing, a Base Station Assigns Data Allocation Priorities to Empty REs Other than DMRS Resource Elements and then Delivers Data Allocation Indication Information to UEs Basically, the MU-MIMO pairing should be transparently achieved. Accordingly, the UE cannot recognize whether it is in the MU-MIMO situation.

Therefore, in this embodiment, whether or not data is allocated to a RE in a DMRS symbol is defined as a specific pattern regardless of MU-MIMO pairing, and only information on whether data is mapped to a corresponding RE is delivered using the available RE pattern indication field.

In this embodiment, a base station and two or more UEs form MU-MIMO pairing.

Figure 9:
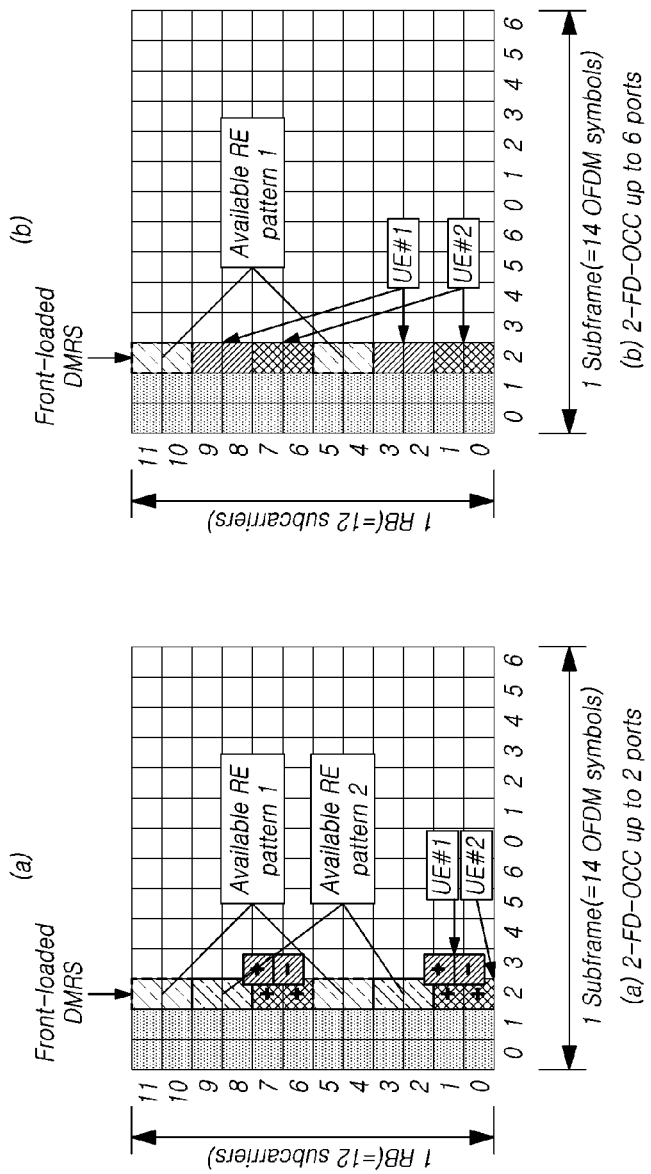
FIG. 9 is a diagram showing an example of a data resource element region and DMRS port allocation considering multi-user (MU) pairing.

For example, FIG. 9 shows that a base station and two UEs (e.g., UE#1 and UE#2) form MU-MIMO pairing.

In this case, DMRSs allocated to the two UEs (e.g., UE#1 and UE#2) may be multiplexed using OCCs on the same DMRS RE as shown in a diagram (a) of FIG. 9 or may be allocated to different DMRS REs as shown in a diagram (b) of FIG. 9. In this case, one of the following four options may be applied to map data to remaining available REs to which no DMRS ports are allocated. At this point, the base station may determine priorities of the options to be different depending on the situation.

Option 1: Allocation of all empty REs to specific UE

For example, all empty REs on an available RE pattern are allocated to one of UE#1 and UE#2 as shown in the diagram (a) of FIG. 9.

Option 2: Allocation of some empty REs to specific UE

For example, empty REs for available RE pattern 1 or 2 are allocated to only UE#1 as shown in the diagram (a) of FIG. 9.

Option 3: Uniform allocation of empty REs to MU-MIMO paired UEs

For example, empty REs on a corresponding available RE pattern are allocated to each of UE#1 and UE#2 as shown in the diagram (a) of FIG. 9.

Option 4: Alternate allocation of empty REs on slot basis

For example, all empty REs on an available RE pattern are allocated to UE#1 in slot index #N (here, N is an arbitrary integer), and all empty REs on the available RE pattern are allocate to UE#2 in slot index #(N+1).

Embodiment 1-4: The Pattern or Locations in which Empty REs in a DMRS Symbol are Allocated are Defined or Chanted on a Slot(s) Basis or on a Subframe(s) Basis Various DMRS patterns may be set by configuring the NR DMRS by a 1-symbol unit or a 2-symbol unit. In this case, the above-described embodiments 1-1 to 1-3 may be used to map data to empty REs other than DMRS REs in the DMRS symbol.

In this case, the available RE pattern is defined to map the data to the empty REs. In this case, an index value indicating the available RE pattern may be defined or changed on the basis of a specific value.

That is, at the same time section location and frequency section location, available RE pattern 1 may be used in specific slot index #N (N is an arbitrary integer), and available RE pattern 2 may be used in slot index #(N+1). The following values may be used as the reference value for indicating the available RE pattern.

Subframe/slot index
Symbol index
Cell ID
Antenna port

Figure 10:
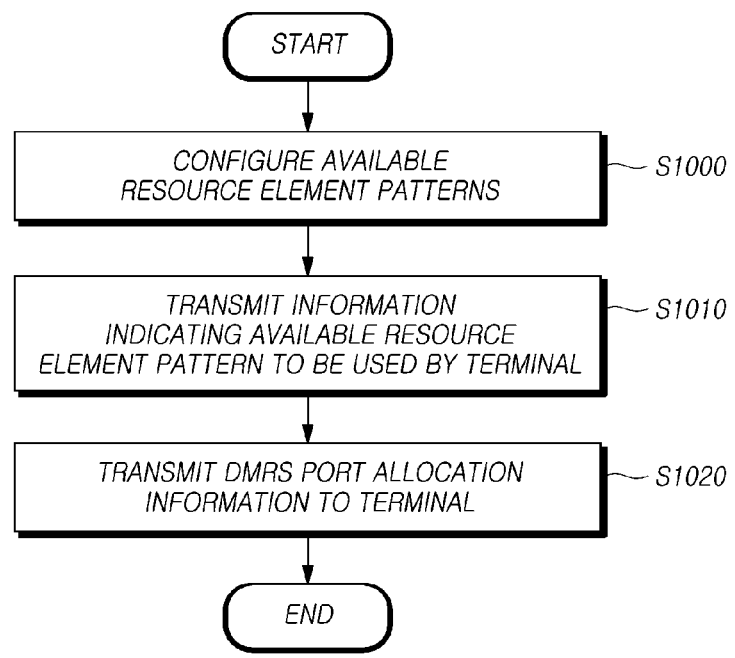
FIG. 10 is a flowchart illustrating a method of a base station for transmitting DMRS port allocation information to a UE according to an embodiment.

FIG. 10 is a flowchart showing a method of a base station for transmitting DMRS port allocation information to a UE according to an embodiment.

Referring to FIG. 10, a base station may configure one or more available RE patterns (S1000).

In this case, each available RE pattern may be composed of REs not allocated to DMRS (e.g., REs that DMRS are not allocated to) o among REs that are located on DMRS symbols and available to be allocated to DMRSs. By using all or some of REs constituting the corresponding available RE pattern, the base station may transmit data to and receive data from the UE, that is, receive UL data from the UE or transmit DL data to the UE.

Alternatively, the base station may transmit, to the UE, information indicating an available RE pattern to be used by the UE among one or more available RE patterns configured in S1000 (S1010). In this case, the information indicating the available RE pattern to be used by the UE may be transmitted to the UE through DCI.

When the base station transmits information indicating the available RE pattern to be used by the UE to the UE, the indication information may be included in a field indicating antenna port information, instead of using a separate independent field in the above-described DCI.

Also, information indicating the number of available RE patterns that can be used by the UE may be included in the information indicating the available RE pattern to be used by the UE. For example, the number of available RE patterns that can be used by the UE may be one, two, or three, and on the basis of the information indicating the number, the UE may recognize which available RE pattern can be used (that is, a first available RE pattern is used when the number is one, the first available RE pattern and a second available RE pattern are used when the number is two, and the first available RE pattern, the second available RE pattern, and a third available RE pattern are used when the number is three.)

Also, the base station may transmit DMRS port allocation information to the UE (S1020).

Figure 11:
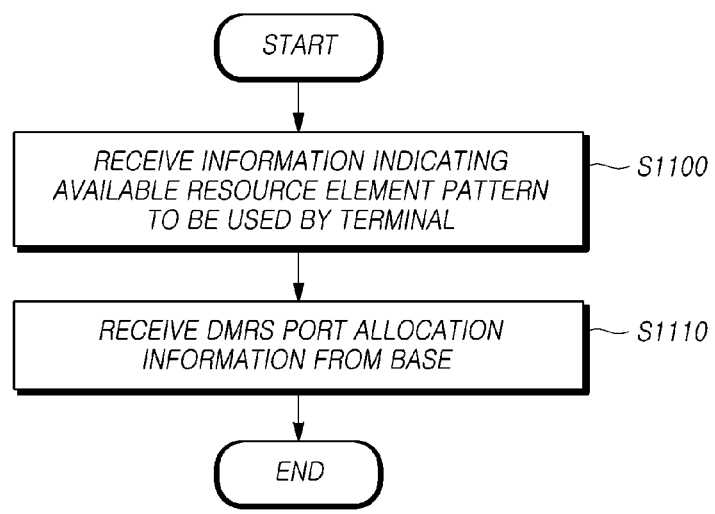
FIG. 11 is a flowchart illustrating a method of a terminal for receiving DMRS port allocation information from a base station according to an embodiment.

FIG. 11 is a flowchart of a UE for receiving DMRS port allocation information from a base station in accordance with an embodiment.

Referring to FIG. 11, the UE may receive information indicating an available RE pattern to be used by the UE from the base station (S1100).

In this case, the available RE pattern may be composed of REs not allocated to DMRSs among REs that are located on a DMRS symbol and available to be allocated to DMRS. The UE may transmit and receive data to and from the base station, that is, receive DL data from the base station or transmit UL data to the base station by using all or some of REs constituting the corresponding available RE pattern.

In this case, the information indicating the available RE pattern to be used by the UE may be received through DCI.

When the UE receives information indicating the available RE pattern to be used by the UE from the base station, the indication information may be contained in a field indicating antenna port information, instead of using a separate independent field in the above-described DCI.

Also, information indicating the number of available RE patterns that can be used by the UE may be included in the information indicating the available RE pattern to be used by the UE. For example, the number of available RE patterns that can be used by the UE may be one, two, or three, and on the basis of the information indicating the number, the UE may recognize which available RE pattern can be used (that is, a first available RE pattern is used when the number is one, the first available RE pattern and a second available RE pattern are used when the number is two, and the first available RE pattern, the second available RE pattern, and a third available RE pattern are used when the number is three.)

Also, the UE may receive DMRS port allocation information from the base station (S1110).

Figure 12:
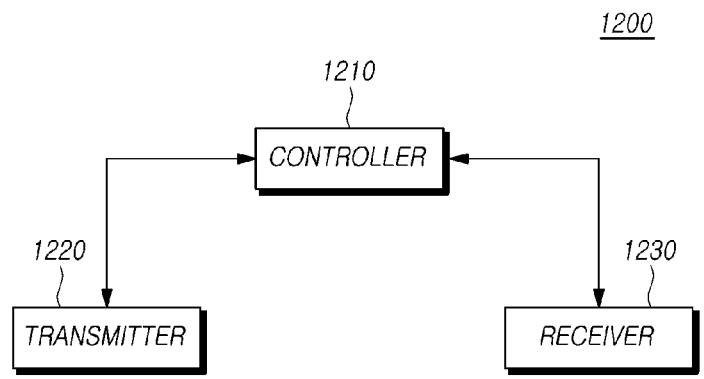
FIG. 12 is a diagram illustrating a base station according to an embodiment.

FIG. 12 is a diagram showing a base station according to an embodiment.

Referring to FIG. 12, a base station 1200 includes a controller 1210, a transmitter 1220, and a receiver 1230.

The controller 1210 may configure one or more available RE patterns.

In this case, the available RE pattern may be composed of REs not allocated to DMRSs among REs that are located on a DMRS symbol and available to be allocated to DMRSs. The base station may transmit data to and receive data from the UE, that is, receive UL data from the UE or transmit DL data to the UE by using all or some of REs constituting the corresponding available RE pattern.

The transmitter 1220 and the receiver 1230 are used to transmit and receive, to and from the UE, signals, messages or data needed to implement the embodiments of the present invention.

In detail, the transmitter 1220 may transmit, to the UE, information indicating an available RE pattern to be used by the UE among the available RE patterns and may transmit the DMRS port allocation information to the UE.

In this case, the information indicating the available RE pattern to be used by the UE may be transmitted to the UE through DCI.

When the base station transmits information indicating the available RE pattern to be used by the UE to the UE, the indication information may be included in a field indicating antenna port information, instead of using a separate independent field in the above-described DCI.

Also, information indicating the number of available RE patterns that can be used by the UE may be included in the information indicating the available RE pattern to be used by the UE. For example, the number of available RE patterns that can be used by the UE may be one, two, or three, and on the basis of the information indicating the number, the UE may recognize which available RE pattern can be used (that is, a first available RE pattern is used when the number is one, the first available RE pattern and a second available RE pattern are used when the number is two, and the first available RE pattern, the second available RE pattern, and a third available RE pattern are used when the number is three.)

Figure 13:
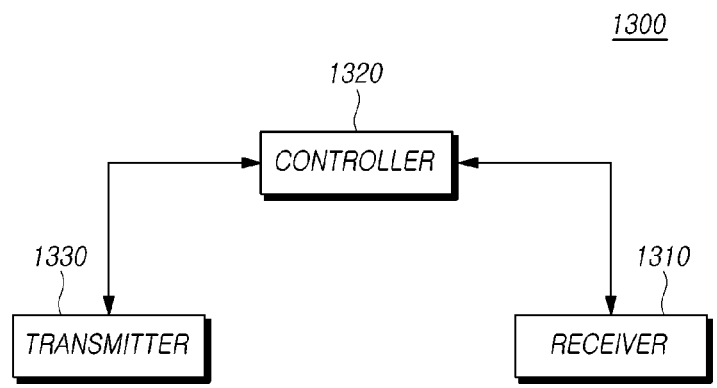
FIG. 13 is a diagram illustrating a terminal according to embodiments.

FIG. 13 is a diagram showing a UE according to an embodiment.

Referring to FIG. 13, a UE 1300 includes a receiver 1310, a controller 1320, and a transmitter 1330.

The receiver 1310 may receive information indicating an available RE pattern to be used by the UE 1300 from the base station and may receive DMRS port allocation information from the base station.

In this case, the available RE pattern may be composed of REs not allocated to DMRSs among REs that are located on a DMRS symbol and available to be allocated to DMRSs. By using all or some of REs constituting the corresponding available RE pattern, the UE may transmit and receive data to and from the base station, that is, receive DL data from the base station or transmit UL data to the base station.

In this case, the information indicating the available RE pattern to be used by the UE may be received through DCI.

When the UE receives information indicating the available RE pattern to be used by the UE from the base station, the indication information may be included in a field indicating antenna port information, instead of using a separate independent field in the above-described DCI.

Also, information indicating the number of available RE patterns that can be used by the UE may be included in the information indicating the available RE pattern to be used by the UE. For example, the number of available RE patterns that can be used by the UE may be one, two, or three, and on the basis of the information indicating the number, the UE may recognize which available RE pattern can be used (that is, a first available RE pattern is used when the number is one, the first available RE pattern and a second available RE pattern are used when the number is two, and the first available RE pattern, the second available RE pattern, and a third available RE pattern are used when the number is three.)

According to the embodiments, data and DMRSs may be multiplexed in a next generation/5G radio access network by allocating DMRS ports and allocating data to empty REs located in DMRS symbols.

Specifications and standards mentioned in the foregoing embodiments have been omitted herein to simplify the description of the present specification but still constitute part of the present specification. Therefore, it should be understood that parts of the specifications and standards can be added to the present specification or be specified in the claims and still be within the scope of the present invention.

The above-described subject matter of the embodiments of the present disclosure is to be considered illustrative and not restrictive, and it should be understood that numerous other modifications and embodiments can be devised by those skilled in the art that will fall within the spirit and scope of the principles of the present disclosure. Therefore, the embodiments disclosed herein are intended not to limit but to describe the technical spirit of the embodiments of the present disclosure, and the scope of the present disclosure is not limited to the embodiments. The scope of the present disclosure should be construed by the appended claims, and all technical sprits within the scope of their equivalents should be construed as included in the scope of the disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method for transmitting, by a base station, demodulation reference signal (DMRS) port allocation information to a terminal, the method comprising:
configuring one or more available resource element (RE) patterns;
transmitting, to the terminal, information indicating an available RE pattern to be used by the terminal among the available RE patterns; and
transmitting the DMRS port allocation information to the terminal,
wherein the available RE pattern is composed of REs not allocated to DMRSs among REs located on a symbol and available to be allocated to DMRSs, and
wherein through the REs in the available RE pattern, the base station receives uplink data from the terminal or transmits downlink data to the terminal.

2. The method of claim 1, wherein the information indicating the available RE pattern to be used by the terminal among the available RE patterns is transmitted to the terminal through downlink control information.

3. The method of claim 2, wherein the information indicating the available RE pattern to be used by the terminal among the available RE patterns is included in a field indicating antenna port information in the downlink control information and then transmitted to the terminal.

4. The method of claim 1, wherein the information indicating the available RE pattern to be used by the terminal among the available RE patterns includes information indicating, among the available RE patterns, a number of available RE patterns to be used by the terminal.

5. The method of claim 4, wherein among the available RE patterns, the number of available RE patterns to be used by the terminal is one, two, or three.

6. A method for receiving, by a terminal, demodulation reference signal (DMRS) port allocation information from a base station, the method comprising:
receiving information indicating an available resource element (RE) pattern to be used by the terminal among one or more available RE patterns configured by the base station; and
receiving the DMRS port allocation information from the base station,
wherein the available RE pattern is composed of REs not allocated to DMRSs among REs located on a symbol and available to be allocated to DMRSs, and wherein through the REs in the available RE pattern, the terminal receives downlink data from the base station or transmits uplink data to the base station.

7. The method of claim 6, wherein the information indicating the available RE pattern to be used by the terminal among the available RE patterns is received from the base station through downlink control information.

8. The method of claim 7, wherein the information indicating the available RE pattern to be used by the terminal among the available RE patterns is included in a field indicating antenna port information in the downlink control information and then received from the base station.

9. The method of claim 6, wherein the information indicating the available RE pattern to be used by the terminal among the available RE patterns includes information indicating, among the available RE patterns, a number of available RE patterns to be used by the terminal.

10. The method of claim 9, wherein among the available RE patterns, the number of available RE patterns to be used by the terminal is one, two, or three.

11. A terminal for receiving demodulation reference signal (DMRS) port allocation information from a base station, the terminal comprising:
a receiver configured to receive information indicating an available resource element (RE) pattern to be used by the terminal among one or more available RE patterns configured by the base station and configured to receive the DMRS port allocation information from the base station,
wherein the available RE pattern is composed of REs not allocated to DMRSs among REs located on a symbol and available to be allocated to DMRSs, and
wherein through the REs in the available RE pattern, the terminal receives downlink data from the base station or transmits uplink data to the base station.

12. The terminal of claim 11, wherein the information indicating the available RE pattern to be used by the UE among the available RE patterns is received from the base station through downlink control information.

13. The terminal of claim 12, wherein the information indicating the available RE pattern to be used by the UE among the available RE patterns is included in a field indicating antenna port information in the downlink control information and then received from the base station.

14. The terminal of claim 11, wherein the information indicating the available RE pattern to be used by the terminal among the available RE patterns includes information indicating, among the available RE patterns, a number of available RE patterns to be used by the terminal.

15. The terminal of claim 14, wherein among the available RE patterns, the number of available RE patterns to be used by the UE is one, two, or three.

* * * * *